United States Patent Office 3,270,274
Patented August 30, 1966

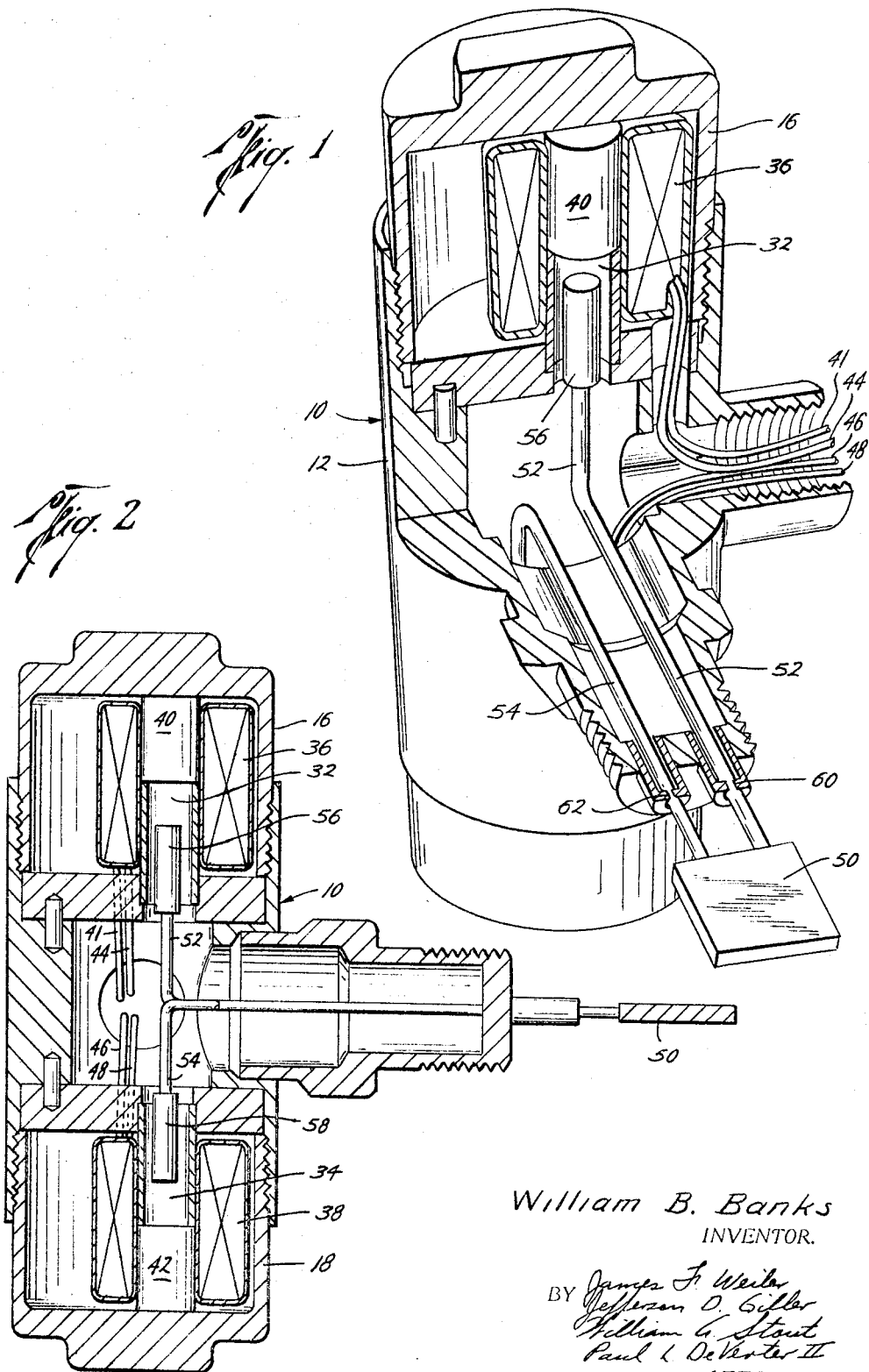

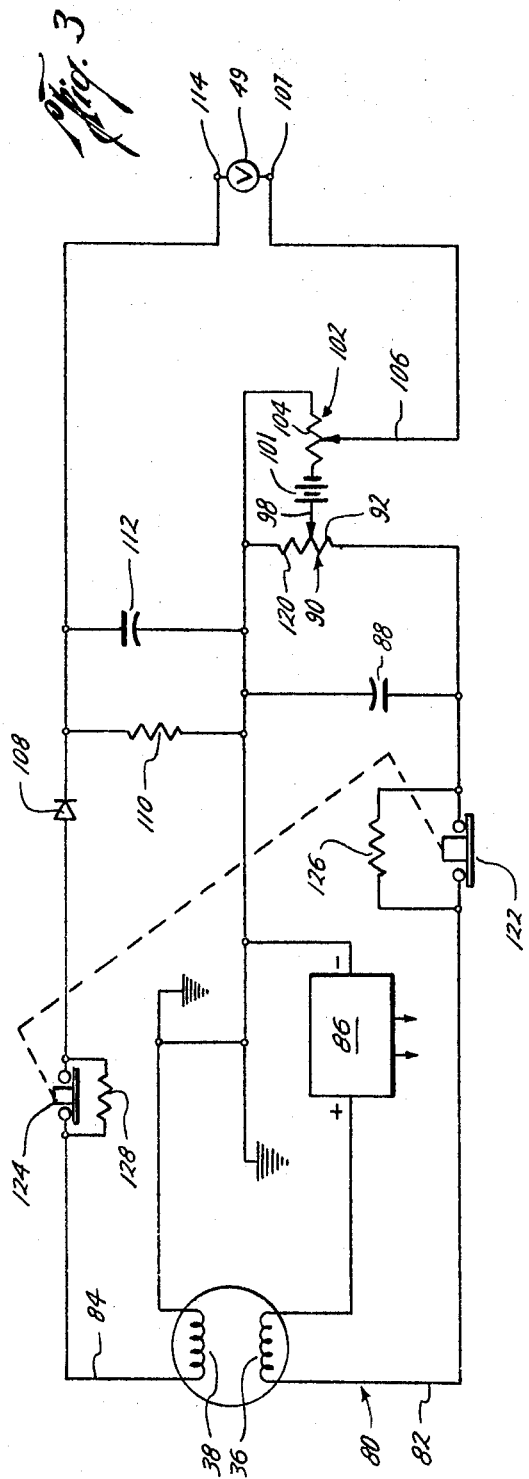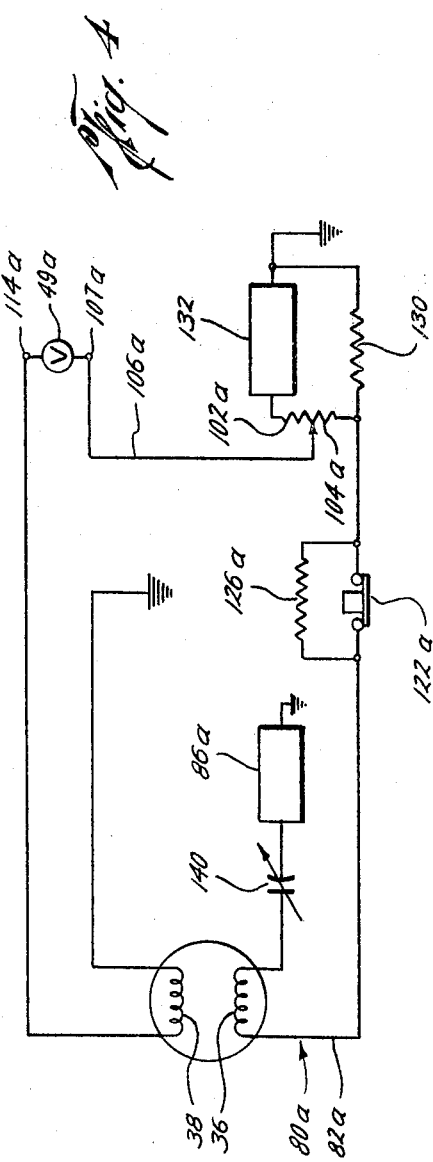

3,270,274
TEMPERATURE COMPENSATING CIRCUIT
William B. Banks, Houston, Tex., assignor to Automation Products, Inc., Houston, Tex., a corporation of Texas
Filed Feb. 15, 1965, Ser. No. 432,689
10 Claims. (Cl. 323—68)

This application is a continuation-in-part application of my co-pending application Serial No. 173,230, entitled Apparatus for Determining Physical Properties of Materials and Temperature Compensating Circuit, filed February 14, 1962, now abandoned.

The present invention relates to a temperature compensating circuit, and more particularly, relates to a temperature compensating circuit for use with an electrical device having two electrical coils wherein the voltage in the second coil is a function of the current in the first coil.

This invention is capable of wide general application in compensating for temperature changes in an apparatus having two electrical coils wherein the voltage in the second coil is a function of the current in the first coil such as in transformers, motors, and electrical sensing devices as disclosed in my Patents Nos. 2,973,639, 3,100,-390 and 3,145,559.

Generally, temperature changes cause a change in the electrical resistance in electrical wire or coils thereby changing the current in the electrical circuit containing such electrical components which have been subjected to temperature changes. This current change is particularly undesirable when in use with an electrical device having two coils wherein the voltage in the second coil is a function of the current in the first coil. Temperature changes will cause a change in the resistance in the coils thereby changing the voltage in the second coil, thus introducing an error signal in the output of the second coil.

Generally, it is an object of the present invention to provide an electrical circuit for creating a signal which is proportional to temperature changes in an electrical apparatus having two electrical coils and combining the signal with the voltage output of the second coil to compensate for temperature changes.

Yet a further object of the present invention is the provision of a temperature compensating circuit for an electrical device having two coils wherein the voltage in the second coil is a function of the current in the first coil by providing electrical means connected to the first coil for creating a voltage signal proportional to temperature changes in the first circuit and means for combining the created voltage signal with the voltage in the second coil thereby compensating for temperature changes.

Still a further object of the present invention is the provision of a temperature compensating circuit for an electrical device including two coil circuits in which the first coil is energized from a constant voltage source and the voltage in the second coil is a function of the current in the first coil by providing electrical current measuring means connected to the first coil for measuring a change in the current of the first coil and creating a voltage signal proportional to such current change and adding the voltage signal to the second coil to compensate for the temperature changes.

Still a further object of the present invention is the provision of a temperature compensating circuit for an electrical apparatus having two coils wherein the voltage in the second coil is a function of the current in the first coil by providing electrical means connected to the first coil for creating a voltage signal proportional to temperature changes in the first circuit and providing a phase shifting means in one of the circuits for shifting the voltage in one of the circuits so as to be in phase with the voltage in the other circuit so that the temperature compensating voltage signal may be vectorially added to the signal output of the second coil.

Yet a still further object of the present invention is the provision of a temperature compensating circuit in an electrical apparatus having two coil circuits each including a coil wherein an electrical filter circuit is connected to each coil to provide a direct current output and wherein electrical means create a direct current signal proportional to temperature changes in the apparatus, and the direct current signal may be easily combined with the output from the second coil to provide a temperature compensated output signal.

Still a further object of the present invention is the provision of a temperature compensating circuit for an electrical device having two coil circuits wherein a reference voltage is provided connected to the first coil circuit for normally balancing the current in the first coil circuit and a potentiometer is provided with its resistor being in series with the reference voltage, and its arm being electrically connected to the output of the second coil to provide a signal to the second coil circuit to compensate for temperature changes.

Yet a further object of the present invention is the provision of a temperature compensating circuit for an electrical instrument having an input coil and an output coil which vary in resistance in accordance with the changes in temperature by providing electrical means connected to the first coil for creating a voltage signal proportional to temperature changes in the apparatus and in which test resistors may be inserted in one or both of the coil circuits for calibrating purposes.

Other and further objects, features and advantages will be apparent from the following description of presently preferred embodiments of the invention, given for the purpose of disclosure and taken in conjunction with the accompanying drawings, where like character references designate like parts throughout the several views and where FIGURE 1 is a perspective elevational view, partly in section, illustrating one form of an electrical device in which the present temperature compensating circuit may be used, FIGURE 2 is a side elevational view, in cross section, of the apparatus shown in FIGURE 1, FIGURE 3 is an electrical schematic of one form of a temperature compensating circuit which may be used to offset errors due to temperature changes, and FIGURE 4 is an electrical schematic of a modified temperautre compensating circuit of the present invention.

The present invention is generally directed to providing a temperature compensating circuit for use with an electrical apparatus having two electrical coils wherein the voltage in the second coil is a function of the current in the first coil such as motors, transformers and material sensing devices. For instance, referring now to the drawings and particularly to FIGURES 1 and 2 the reference numeral 10 generally designates an apparatus for determining various physical properties of material which includes a driving coil and a sensing coil as will be more fully explained. The apparatus 10 may include a housing 12 including tubular side portions 16 and 18.

The electromagnetic motor or drive vibration means is enclosed in and located in the housing end 16. Thus, an electromagnetic coil 36 is positioned in the end 16 and surrounds and is supported by a nonmagnetic tubular sleeve 32. A magnetic core 40 is located within the electromagnetic coil 36 and electrical connections 41 and 44 supply electrical current from an external source to the electromagnetic coil 36 which sets up vibrations in a flexible vibratory element 52.

The detector means or signal assembly is located in the housing side portion 18 and includes a detecting electromagnetic coil 38 disposed about and supported by a nonmagnetic tubular sleeve 34. A permanent magnet 42 is disposed within the electromagnetic coil 38 and thus provides a magnetic field for the coil 38. Connected to the electromagnetic coil 38 are electrical connections 46 and 48 which carry a signal generated in the detecting coil 38 to any suitable electrical indicating or control means. Any suitable electrical control or detecting means may be used such as control relays (not shown) or an indicating volt meter 49 (FIGURE 4), all of which are conventional and no further description is deemed necessary.

Vibratory means are provided consisting of a paddle 50 and flexible vibratory elements or rods 52 and 54, said rods being attached at one end to the paddle 50. At the other end of the flexible rods 52 and 54, respectively, are attached armatures 56 and 58.

Thus, electricity is connected by the electrical conductors 41 and 44 to the electromagnetic driving coil 36 which constitutes the motor or vibrator means by which the vibratory elements 52 and 54 are caused to vibrate. Thus when the electromagnetic coil 36 is energized by an alternating current, or a pulsating D.C. current, the armature 56 is attached and released to cause the vibratory rod 52 to vibrate at the applied frequency. The vibration from the rod 52 is transmitted to the vibratory paddle 50 through a node point support 60 and the vibration of the paddle 50 will be transmitted from the paddle end of the flexible rod 54 through its node point support 62 to the armature 58. The electromagnetic or detecting coil 38 generates a voltage caused by the vibration of the armature 58 in the magnetic field of the permanent magnet 42. Thus, the physical properties of any variations in material in which the paddle 50 is inserted change the vibratory amplitude transmitted back through the rod 54 and thus changes the signal output of the detector coil 38.

Generally, the above named and described apparatus is shown in my above named patents. However, the electrical coils vary in resistance in accordance with changes in temperature. For instance, if the temperature increases, the electrical resistance of an electrical wire or coil increases. Thus, with a constant voltage source, the current in a particular circuit would decrease linearly within the normal range of temperatures encountered. Therefore, considering the material sensing apparatus 10, an increase in operating temperature would cause a decrease in the current through both the driving coil 36 and the detector coil 38 would cause a signal decrease across the output of the detector coil 38 giving a change in signal, not from changes in the material being measured, but due solely to temperature changes. Thus, the output signal changes and causes an error in the output reading when the operating temperature either increases or decreases.

Referring now to FIGURE 3, the present invention is directed to providing a temperature compensating circuit 80 which generally includes an input circuit 82 connected to the driving coil 36 and an output circuit 84 connected to the detector coil 38. A conventional power supply 86, having a constant output voltage, is connected in the input circuit 82 and applies a constant voltage to that circuit. Preferably, the output voltage of the power supply 86 is a pulsating D.C. current applied to coil 36 for driving the apparatus 10. However, in order to provide a compensating signal which is easy to combine or modulate, a capacitor 88 is provided in the circuit 82 for filtering the pulsating D.C. to provide a pure D.C. voltage for signal compensating purposes as will be more fully described. If the power supply were alternating current, a suitable rectifier (not shown) would be placed in circuit 82.

Generally, the temperature compensating circuit is electrically connected to the input circuit 82 for measuring changes in the current in the input circuit 82 due to temperature changes in that circuit. Thus, suitable current measuring means is provided for normally indicating when the current in the input circuit 82 changes. For example only, a potentiometer 90 may be provided in the input circuit 82 with the resistor 92 of the potentiometer 90 receiving the filtered D.C. current that is applied across the condenser 88. Thus, a D.C. current is provided to the potentiometer resistor 92 which is proportional to the current through the driving coil 36. The arm 98 of the potentiometer 90 is connected to a suitable reference voltage source, for example, a battery 101. Thus, it is to be noted that the current passing through the resistor 92 will vary in proportion to the current passing through the coil 36. Since the voltage supply 86 in the input circuit 82 is constant, the only change in the current in the input circuit 82 will be caused by a change in temperature. Therefore, the purpose of the potentiometer 90 is to detect any changes in the current in circuit 82 caused by change in temperature and to provide a compensating signal to be modulated with or added to the output signal from the detector coil 38 to offset any signal due to temperature changes. Therefore, with the circuit 80 under normal operating conditions, the arm 98 of the potentiometer 90 is adjusted until the voltage drop across the end portion 120 of the resistor 92 (that is from the arm 98 to ground is equal and opposite to the voltage of the battery 101. Of course, the potentiometer 90 may be omitted and a suitable fixed resistor can be used in place of portion 120 if its value is such that its voltage drop due to the current in the input circuit 82 is equal and opposite to the voltage of the battery 102.

In order to provide a linear compensating signal calibrating means such as a second potentiometer 102 is provided having a resistor 104 connected in the balancing circuit to the voltage source 101. The arm 106 of the second potentiometer 102 is connected to an output terminal 107, one of the signal output leads. With the potentiometer 90 adjusted so that the voltage drop across the end portion 120 of the resistor 92 is equal and opposite to the voltage of the battery 101, a change in the current in the circuit 82 due to a temperature change will also cause a change in the current through the resistor 92. Thus, the voltage drop across the portion 120 of the resistor 92 will change so as to cause an unbalance in the circuit including the potentiometer arm 98 of potentiometer 90 and reference voltage 101 thereby creating a current through the resistor 104 of the second potentiometer 102. A signal will then be introduced on the arm 106 and the terminal 107 to reflect a change in the temperature. However, this signal must still be adjusted in order to provide a linear change in signal due to temperature changes. Therefore, the arm 106 of the second potentiometer 102 must be suitably adjusted relative to the resistor 104 to provide a compensating signal for all temperatures within the linear temperature-resistance change range.

Therefore, the arm 106 is adjusted to a point so that all temperature changes will give a proportional signal to the output 107 as the temperature changes. One way of suitably adjusting the arm 106 is to vary the temperature of the coils 36 and 38 and set the arm 106 so that the output reading across the output lines 107 and 114 will be the same before and after the temperature changes. However, such a method is inconvenient. Therefore, a pair of switches 122 and 124 are positioned in the circuits 82 and 84, respectively, and are preferably mechanically interlocked. The normally closed switches 122 and 124, when actuated, place resistors 126 and 128, respectively, into the circuits 82 and 84, respectively. The addition of these resistors to the circuit simulates a temperature increase in which the resistance of the coils 36 and 38 increases. Therefore, when the resistances 126 and 128 are placed in the circuit the potentiometer arm 106 is adjusted so that the same output reading of a volt meter 49 across the output terminals 114 and 107 will be the same before and after the switches 122 and 124 are actuated. Thus, after the potentiometers 90 and 102 have been set, any ambient temperature changes will not cause changes in the output signal of the apparatus 10. Since the range in which the change in resistance with the change in temperature is linear within the operating conditions that the apparatus 10 will encounter, the temperature compensating circuit 80 will satisfactorily compensate for all temperature conditions to which the apparatus 10 is normally subjected.

Of course, even the potentiometer 102 may be replaced with a fixed resistor assuming that its value is correct to provide a linear signal to the output terminal 107; however, potentiometer 102 provides greater flexibility for calibration.

Referring to the output circuit 84 which is connected to the output coil 38, a suitable diode 108, a resistance 110 and a capacitor 112 is provided to convert the A.C. current generated in the coil 38 to a pulsating D.C. current and filter it. The terminal 114 forms the other output signal terminal with terminal 107. Thus, it is noted that a D.C. temperature compensating signal is presented to the terminal 107 and a D.C. output signal from the output circuit 84 is provided at the output terminal 114 which when combined provide a temperature compensated output signal at the output terminals 114 and 107, to which may be connected volt meter 49. The switch 124 and resistor 128 may be omitted if the resistance of the output circuit 84 is low as the temperature won't have any appreciable effect so long as the resistor 110 and the resistance of the volt meter 49 is high as compared to the resistance of the coil 38.

Of course, various modifications of the temperature compensating circuit can be used to provide means electrically connected to the first coil 36 for measuring a change in the current in the first coil and provide a compensating voltage signal which is added to the voltage output signal of the second coil 38 compensates for any temperature change. FIGURE 4 illustrates a modification of the temperature compensating circuit according to the present invention, the letter "a" being applied to the parts corresponding to those in FIGURE 3. Thus, power supply 86a provides a constant alternating current voltage to the input circuit 82a and to the coil 36. The alternating current passing through coil 36 passes through a fixed resistor 130 to ground. The resistor 130 is sized so that the voltage drop across the resistor 130 is equal and opposite to the voltage through the resistor 130 from a suitable reference voltage source 132.

A potentiometer 102a is provided in the circuit between the voltage source 132 and the fixed resistor 130 and so long as there is no voltage drop across the resistor 130 there will be no compensating signal appearing across the resistor 104a of the potentiometer 102a and thus at the arm 106a. However, a change in the current in the circuit 82a due to a temperature change will cause a change in the current through the resistor 130 so as to cause unbalance in the circuit containing the voltage source 132, the resistor 104a and the resistance 130. A signal will then be introduced on the potentiometer arm 106a to reflect this change in the temperature. However, this signal change must still be adjusted similar to the adjustment of potentiometer 106 to provide a linear change in signal due to temperature changes. This may be done with a single calibrating switch 122a and resistor 126a. That is, a calibrating switch in the output circuit 84 is not needed so long as the resistance of the volt meter 49a is much higher than the resistance of the coil 38.

It will be noted in FIGURE 4 that filter circuits are not provided as in FIGURE 3, and that therefore an alternating current compensation signal is provided at the terminal 107a to be added to or modulated with the output signal from the coil 38 at terminal 114. However, in order to properly combine two A.C. signals, they must be added vectorially. Therefore, a suitable phase shifting means must be provided in one of the circuits 82 and 84, here shown as a variable condenser 140 in circuit 82a so that the temperature compensating signal at terminal 107a and the output signal from coil 38 at terminal 114a will be electrically in phase so that they may be properly added vectorially.

In operation, the temperature compensating circuit 80 and 80a may be utilized with the material sensing apparatus 10 or with other electrical devices having two coils such as transformers and motors. In the input coil circuit 82 a pulsating D.C. voltage supply 86 provides a constant and pulsating D.C. current. Therefore, a fluctuating D.C. current passes through the driving coil 36, is filtered through the capacitor 88 and establishes a D.C. current through the resistor 92 proportional to the current through the coil 36. Under normal operating conditions and temperatures the movable arm 98 of the potentiometer 90 is adjusted, or a fixed resistor is provided, so that the voltage drop across the portion 120 of the resistor 92 is equal and opposite to a reference voltage such as battery 101. When this condition is met there will be no voltage drop across resistor 104 and thus no compensating signal will appear at the terminal 107.

At the same time a voltage will be induced in the detector coil 38 which will be rectified through the diode 108 and filtered by the resistor 110 and capacitor 112 to provide a D.C. output signal at the terminal 114. In order to adjust the potentiometer 102, thereby calibrating the circuit 80, the interlocked switches 122 and 124 are actuated thereby placing the resistors 126 and 128 in the circuits 82 and 84, respectively. This artificially creates a condition corresponding to a predetermined increased temperature which increases the resistance of the circuits 82 and 84. The current through the circuit 82 will now change and thereby produce a change in the voltage drop across the end portion 120 of the resistor 92. This in turn will create a current through and a voltage drop across the resistor 104. The arm 106 of the potentiometer 102 is then varied so that the same output reading across the output meter 49 at the terminals 114 and 107 is achieved both before and after the switches 122 and 124 are actuated. After the potentiometers 90 and 92 have been set any changes in the resistance of the coils 36 and 38 due to changes in the temperature within the linear range will be offset so as not to change the output signal across the terminals 114 and 107.

Referring now to FIGURE 4, the temperature compensating circuit 80a is similar to that previously described. An alternating current voltage supply 86a passes a current through the driving coil 36, through the closed switch 122a and through the resistor 130. Since the resistor 130 is of such a value that the voltage drop across this resistor is equal and opposite to the voltage of the reference voltage source 132 no voltage drop will appear across the resistor 104a and thus no compensating signal will appear at the terminal 107a. However, after calibration, if the temperature in the coil 36 changes, the voltage drop across the resistor 130 will change thereby creating a current through and a voltage drop across the resistor 104a, which as previously described may also be a fixed resistor of predetermined value. Thus, a voltage drop will appear across the resistor 104a and a compensating signal will appear on the arm 106a and at the terminal 107a to be added to the output signal in the output circuit 84a at the terminal 114a. Of course, to insure that these alternating current signals may be properly added vectorially the phase shifting means 140 must be suitably adjusted to insure that the voltages in the input circuit 82 and the output circuit 84 are in phase with each other.

And, of course, the compensating circuits 80 and 80a may be periodically tested and calibrated by actuating the calibrating switches 122 and 124, and readjusting the potentiometers 102 and 102a if necessary, to insure that the circuits 80 and 80a are linearly responsive to changes in temperature.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In an apparatus having first and second coil circuits, the voltage in the second coil circuit being a function of the current in the first coil circuit, the improvement in a temperature compensating means comprising, electrical means connected to the first coil circuit for measuring a change in the current in said first circuit due to temperature changes in said first circuit, means in said first circuit converting the change in current to a voltage signal, and means for vectorially adding the voltage signal to the voltage in the second coil circuit thereby compensating for said temperature changes.

2. In a material sensing apparatus having first and second coil circuits each including a coil, the first coil being a driving coil and energized from a constant voltage source, and the second coil being a sensing coil in which the voltage is a function of the current in the driving coil, the combination of a temperature compensating circuit comprising, electrical current measuring means connected to the first coil circuit for measuring a change in the current in said first circuit, means in said first coil circuit converting the change in current to a voltage signal, and means for adding the voltage signal to the voltage in the second circuit thereby compensating for said temperature changes.

3. An apparatus for compensating for temperature changes in an apparatus having two coil circuits each including a coil, the first of said coils energized from a constant voltage source and causing a voltage in the second coil, the improvement in a temperature compensating circuit comprising, electrical current measuring means connected to the first coil circuit for measuring a change in the current in said circuit caused by changes in the temperature, phase shifting means in one of said circuits for shifting the voltage in one of said circuits in phase with the voltage in the other circuit so that the voltage can be vectorially added, means in the first circuit converting the change in current to a voltage signal, and means for vectorially adding the voltage signal to the voltage in the second coil circuit thereby compensating for said temperature changes.

4. In an apparatus having first and second coil circuits each including a coil, the first of said coils energized from a constant voltage source and causing a voltage in the second coil, the improvement in a temperature compensating circuit comprising, an electrical filter circuit in each coil circuit for changing the current in each coil circuit to direct current, means for measuring a change in current in said first circuit caused by changes in the temperature, means in said first circuit converting the change in current to a direct current voltage signal, and means for adding the direct current voltage signal to the direct current voltage in the second coil circuit thereby compensating for temperature changes.

5. A temperature compensating cricuit for compensating for temperature changes in an apparatus having first and second coil circuits each including a coil, the first of said coils energized from a constant voltage source and the voltage in the second coil being a function of the current in the first coil comprising, a filter circuit in each coil circuit filtering the current in each coil circuit to provide an output of direct current, means in the first circuit providing a direct current voltage to normally balance the direct current output of said first coil circuit, means in the first circuit connected to the direct current means providing a voltage for measuring a change in the current in the first circuit caused by changes in the temperature, and providing a direct current voltage in proportion to such temperature change, and means for adding the direct current voltage signal to the output of direct current of the second coil circuit.

6. A temperature compensating circuit for an electrical sensing device having first and second coil circuits each including a coil, the first of said coils energized from a constant voltage source and the voltage in the second coil being a function of the current in the first coil comprising, a filter circuit in each coil circuit filtering the current in each coil circuit to provide an output of direct current, a reference voltage source in the first coil circuit normally balancing the output of direct current from the first circuit, a potentiometer having a resistor and a movable arm, the resistor being in series with the reference voltage source, and the arm being electrically connected to the output of direct current in the second circuit to provide a signal to compensate for temperature changes.

7. The apparatus of claim 6 including, a parallel circuit including a switch and resistance connected in series with the first coil circuit providing artificial means for calibrating said potentiometer for temperature changes.

8. The apparatus of claim 6 including, a parallel circuit including a switch and resistance connected in series in each of the first and second coil circuits providing artificial means for calibrating said potentiometer for temperature changes.

9. A temperature compensating circuit for an electrical device having first and second coil circuits each including a coil, the first of said coils energized from a constant alternating voltage source and the voltage in the second coil being a function of the current in the first coil comprising, a filter circuit in each coil circuit filtering the alternating current in each coil circuit to provide an output of direct current, a first potentiometer including a resistor and a movable arm, said first potentiometer resistor connected to the filter circuit in said first coil circuit, a reference voltage source connected to the arm of the first potentiometer, a second potentiometer having a resistor and a movable arm, the second potentiometer resistor connected in series to the arm of the first potentiometer, and the arm of the second potentiometer connected to the direct current output of the second circuit to provide an electrical signal which will compensate for temperature changes.

10. The apparatus of claim 10 including, a parallel circuit including a switch and resistance connected in series in each of the first and second coil circuits providing artificial means for calibrating said second potentiometer for temperature changes.

References Cited by the Examiner

UNITED STATES PATENTS

| 339,773 | 4/1886 | Hering | 322—34 |
| 2,995,703 | 8/1961 | Rogers | 324—62 |

FOREIGN PATENTS

| 177,381 | 8/1935 | Switzerland. |

JOHN F. COUCH, *Primary Examiner.*

LLOYD McCOLLUM, *Examiner.*

W. H. BEHA, *Assistant Examiner.*